United States Patent [19]

Kersten et al.

[11] Patent Number: 4,492,425

[45] Date of Patent: Jan. 8, 1985

[54] DEVICE FOR DEFLECTING LIGHT THROUGH 180 DEGREES

[75] Inventors: Ralf T. Kersten; Karl H. Tietgen; Helmut F. Schlaak, all of Berlin, Fed. Rep. of Germany

[73] Assignee: Siemens Aktiengesellschaft, Berlin & Munich, Fed. Rep. of Germany

[21] Appl. No.: 338,003

[22] Filed: Jan. 8, 1982

[30] Foreign Application Priority Data

Mar. 9, 1981 [DE] Fed. Rep. of Germany ....... 3108814

[51] Int. Cl.$^3$ .............................................. G02B 5/172
[52] U.S. Cl. ............................. 350/96.14; 350/96.13
[58] Field of Search ...................... 350/96.14, 97, 288, 350/96.12, 96.13, 96.15; 250/230

[56] References Cited

U.S. PATENT DOCUMENTS 4,211,467  7/1980  Cross et al. ..................... 350/96.14

OTHER PUBLICATIONS

K. H. Tietgen, "Problems of Integrated Optics Topography", *Digest of Workshop on Integrated Optics*, Technische Univesität Berlin, May 1980, pp. 114-120.

L. D. Hutcheson et al., "Losses in Diffused LiNbO$_3$ Waveguides Caused by Directional Changes", *Digest of Topical Meeting on Integrated and Guided Wave Optics*, Incline Village, Jan. 28-30, 1980, Paper WB 2, pp. WB 2-1 to WB 2-4.

H. Kogelnik et al., "Switched Directional Couplers with Alternating $\Delta\beta$", *IEEE Journal of Quantum Electronics*, vol. QE-12, No. 7, Jul., 1976, pp. 396-401.

R. V. Schmidt et al., "Electro-optically Switched Coupler with Stepped $\Delta\beta$ Reversal Using Ti-diffused LiNbO$_3$ Waveguides", *Applied Physics Letters*, vol. 28, No. 9, May 1, 1976, pp. 503-506.

S. K. Sheem et al., "Wavelength Monitoring of Single-mode Diode Laser Using Guided-wave Interferometer", *Optics Letters*, vol. 5, No. 5, May 1980, pp. 179-181.

E. Hörmann et al., "Titanium-Diffused LiNbO$_3$ Waveguide Modulators and Switches Based on the Directional Coupler Principle", *Siemens Forsch.-u Entwickl.-Ber.*, vol. 9, No. 3, 1980, pp. 163-167.

*Primary Examiner*—William L. Sikes
*Assistant Examiner*—Robert E. Wise
*Attorney, Agent, or Firm*—Hill, Van Santen, Steadman & Simpson

[57] ABSTRACT

A device for deflecting light through 180° characterized by a directional coupler comprising a pair of strip waveguides formed on a substrate with the end faces of the pair of strip waveguides being provided with a mirror. The directional coupler may be formed as a half of a coupler with the mirror effectively bisecting the length of the coupler, or it may be a $\Delta\beta$ reversible directional coupler which is the whole length or as a half of a directional coupler. In addition, the directional coupler may be a controllable power dividing coupler and a phase shifter may be applied on one of the waveguides of the coupler. The device can also be utilized in a spectral comb filter.

19 Claims, 9 Drawing Figures

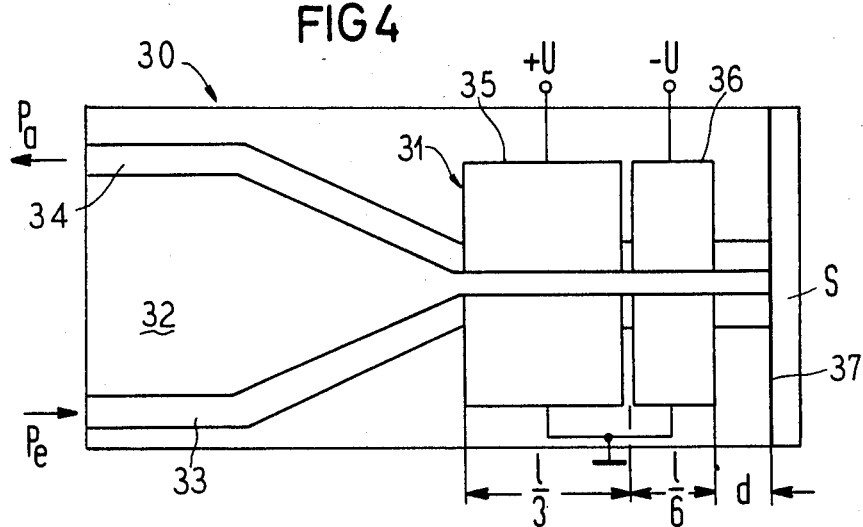
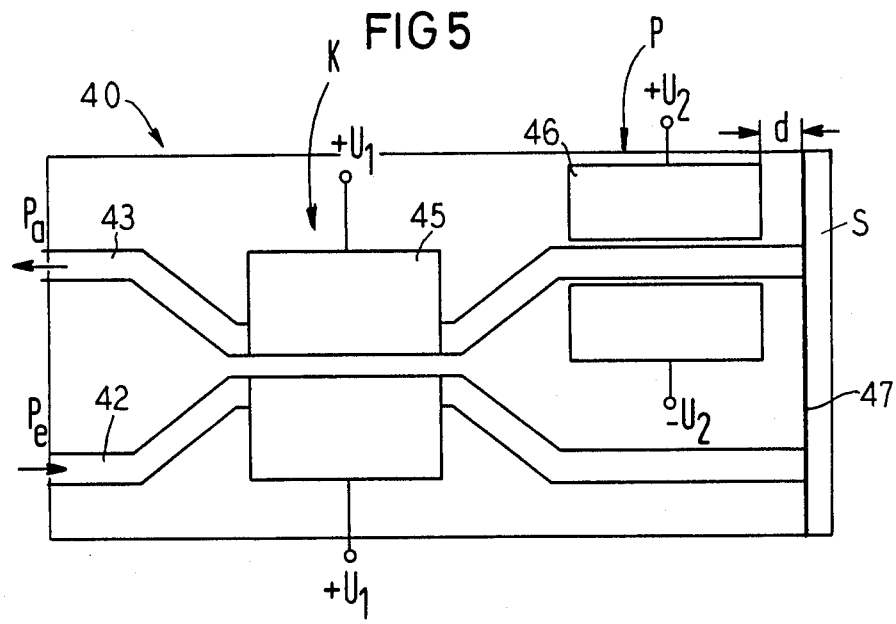

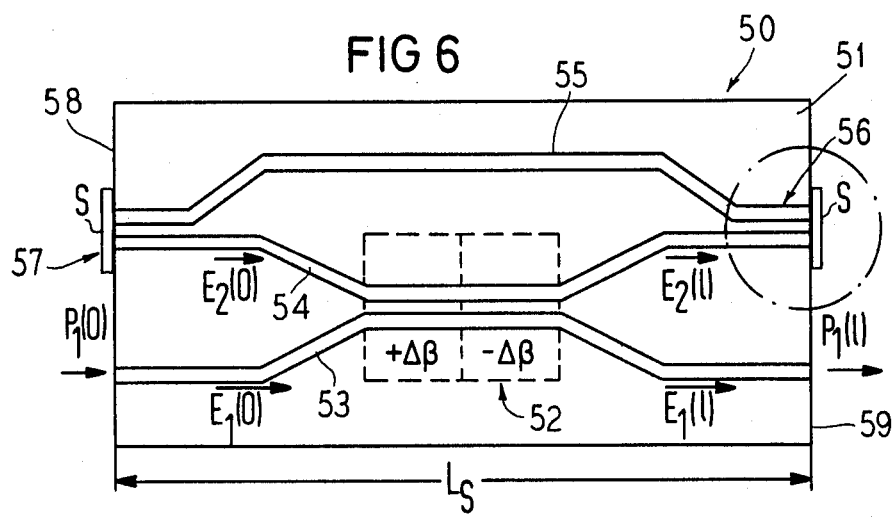
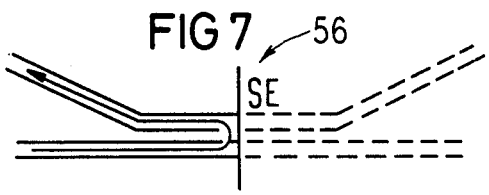

DEVICE FOR DEFLECTING LIGHT THROUGH 180 DEGREES

BACKGROUND OF THE INVENTION

The invention is directed to a 180° deflector or a device for deflecting light through 180°.

In order to be able to economically realize more complex integrated optical circuits, for example, optical coupling fields on a conventional substrate having a square surface, and in order to construct simple, feedback integrated optical circuits, a 180°-deflection or bending of the light guided in a strip waveguide is necessary.

Up to the present time, only circularly curved waveguides were examined as a possibility of feeding back or reversing the direction of the light in an integrated optical circuit. Such a waveguide is disclosed in a paper by L. D. Hutcheson, I. A. White, and J. J. Burke, "Losses in diffused LiNbO3 waveguides by directional changes", *Digest of Topical Meeting on Integrated and Guided Wave Optics,* Incline Village, Jan. 28-30, 1980, Paper WB 2. The inevitably occurring emission losses decrease with an increasing difference of the index of refraction between the waveguide and an external medium and the losses are dependent upon the waveguide cross-sectional dimensions, the wavelengths and the radius of curvature of the waveguide. The cross-sectional dimensions can only be slightly varied for the monomode operation of unsymmetrical waveguides utilizing a fixed light wavelength. The index of refraction difference between waveguides, which have resulted through diffusion of titanium into a lithium niobate and the lithium niobate substrate lie between 0.005 and 0.01. For low losses, which are approximately 0.5 dB for a 180° deflection, a minimum radius of curvature of several centimeters is required. If one realizes the small width of the integrated optical components, which widths, for example, for a directional coupler amounts to approximately 30 $\mu$m with an overall length of 6 mm, then it can be recognized that the radius of curvature of several centimeters is impractical and signifies a waste of usable substrate surface. The entire system of problems of the topography of integrated optical circuits has been left out of consideration up to the present time. A mere reduction of the radius of curvature of the waveguides, which is formed by diffusing titanium into a lithium niobate substrate, would cause such great losses due to emission of radiation for the guided wave, that other, space-saving solutions must be found for the purpose of achieving an optimum utilization of the substrate surface.

SUMMARY OF THE INVENTION

The present invention is directed to providing a 180°-deflector or device for deflecting a light through 180° which when compared with a deflection or bending by use of curved waveguides requires a substantially smaller substrate surface and thereby permits the construction of very complex integrated optical systems with full utilization and exploitation of the substrate surface.

In accordance with the invention, a device for deflecting light through 180° comprises a directional coupler having a pair of parallel extending strip waveguides having end faces and means for providing a mirror on the pair of end faces of the waveguides so that light traveling in the waveguide is reflected.

In an embodiment of the invention, the device or 180°-deflector utilizes a directional coupler which is cut in half and whose end surface is then provided with a mirror.

Since there are various possiblities of providing the directional coupler, there are various combinations available for the construction of the inventive device or 180°-deflector. It is important here, that, within some complex structure, the phase sensitivity of the directional coupler is taken into consideration.

Technological difficulties are present in the case of a normal directional coupler because the coupling length, which must be exactly observed to enable obtaining a complete overcoupling of the light from one waveguide into the second coupler arm or waveguide, is also dependent upon the coupling coefficient between the waveguides. This problem can be solved through utilization of a controllable directional coupler with adjacent sections of oppositely directed phase mismatch. An example of such a coupler is disclosed in an article by H. Kogelnik and and R. V. Schmidt, "Switched directional couplers with alternating $\Delta\beta$", *IEEE Journal of Quantum Electronics,* Vol. QE-12, No. 7, July, 1976, pp. 396-401.

By utilizing the arrangement of the switchable directional couplers in the structure of the present invention, a simple adjustment of the coupler as well as a simple construction of the electrodes can be obtained. Thus, the coupler of the present invention can be easily manufactured and have a high switching frequency.

When utilizing a metallic mirror with a switchable coupler of the present invention, care must be taken to prevent a short circuit of the electrode pairs which are immediately disposed closest to the mirrored end face of the waveguides. Since the end faces must be polished and ground by utilizing necessary processing steps, the amount of the waveguides being removed by these processing steps cannot be precisely determined. Thus, one embodiment of the present invention provides a distance d between the control electrodes and the mirrored end faces of the waveguides to prevent short circuiting of the electrodes.

The presence of such a distance d no longer permits a complete overcoupling of the light from the one arm to the second arm or waveguide of the directional coupler. In order to be able to couple the light completely into the second waveguide of the directional coupler in spite of the presence of the distance d, a phase shifter is arranged in one embodiment of the invention, between the directional coupler and the mirrored end face of the stripped waveguides. Advantageously, the controllable directional coupler is thus so mismatched that it operates as a power divider (3 dB coupler). Advantageously, the phase rotation can be adjusted by the phase shifter.

The proposed optical feedbacks not only can serve the purpose of optimally utilizing substrates for integrated optics in terms of the surface area, but they also enable the construction of a novel feedback optical systems. In a typical example, at least one inventive 180°-deflector is employed for a spectral comb filter. Advantageously, a spectral comb filter exhibits a controllable directional coupler and two half directional couplers, which are provided with mirrored end faces. Advantageously, the controllable directional couplers is a two-stage $\Delta\beta$ directional coupler. A very narrow-band optical filter can be constructed whose properties are to be strongly influenced by the fraction of feedback in the introduced phase shift. Since this spectral optical filter can be constructed in a narrow band fashion, minimum changes in the wavelength of the source can be detected.

BRIEF DESCRIPTION OF THE DRAWINGS

FIG. 4 is a plan view of a device in accordance with the present invention and which device is a practical manufactured embodiment which utilizes a switchable directional coupler;

FIG. 5 is a plan view of a device according to the present invention utilizing a beam deflector with a 3 dB coupler and phase shifter;

FIG. 6 is a plan view of a spectral comb filter in accordance with the present invention;

FIG. 7 is a schematic illustration for diagrammatically showing a portion of the filter illustrated in the circle 7 of FIG. 6;

DESCRIPTION OF THE PREFERRED EMBODIMENTS

Figure 1:
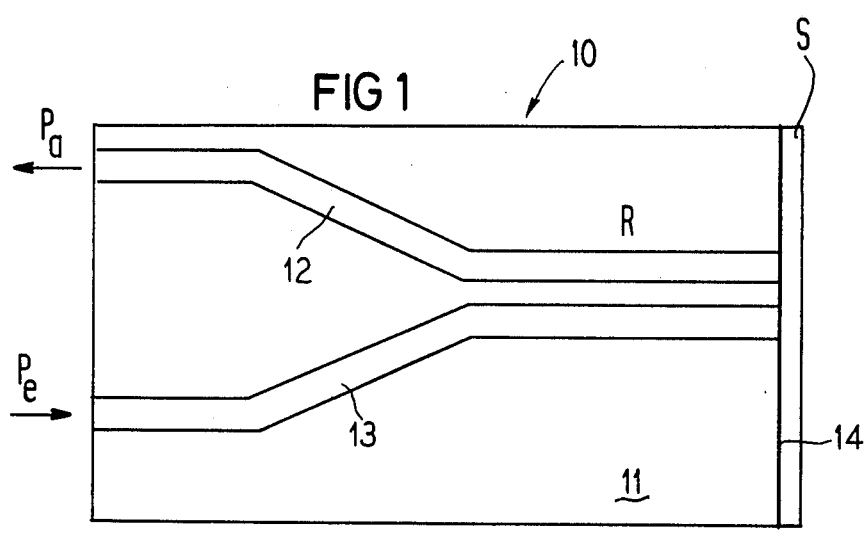
FIG. 1 is a plan view of a 180° beam deflector or device in accordance with the present invention utilizing half of a directional coupler.

The principles of the present invention are particularly useful in a device for deflecting light or a 180°-deflector generally indicated at 10 in FIG. 1. The 180° deflector 10 comprises a substrate 11 of lithium niobate, which contains one half of a directional coupler R, which is composed of a pair of strip waveguides or arms 12 and 13, which are preferably titanium-diffused lithium niobate. The waveguides 12 and 13 have their end faces provided with means forming a mirror such as the layer S placed on an edge 14 of the substrate 11. If the directional coupler R were a complete directional coupler and the length l were equal to the so-called simple coupling length L, then the entire light power $P_e$, which is coupled into the one arm or waveguide 13 of the directional coupler R, would be coupled over into the other arm or waveguide 12 of the coupler and appears as light power $P_a$ at the output of the 180°-deflector. Losses occur only as a consequence of the customary waveguide attenuation and as a consequence of the mirror S. Under the assumption that the attenuation for titanium-diffused lithium niobate waveguides amounts to 0.1 dB/cm, that 95% of the light power is reflected at the mirror S, and that the overall length of the directional coupler amounts to 2 mm, the losses in the case of such a 180°-deflector amount to less than 0.3 dB.

The mirrors S can be formed by either dielectric multiple-layers or metallic coatings. It is important that the mirror S exhibits a high reflectivity. For this purpose, the end wall or edge 14 of the substrate 11 must be highly polished with conventional methods and the edges of the substrate 11 must be manufactured to be as sharp as possible. The mirror S can be easily applied on this processed end face 14 of the half wave directional coupler. Since the lateral edges of the substrate can be polished only after manufacture of the integrated optical circuit, the length l of the directional coupler R is altered in a non-defined manner. Thus, it is sometimes difficult to obtain this desired length l for the coupler R.

In order to be able to control the coupling of light power from one arm or waveguide such as 13 to the other arm 12 in a directional coupler of random length l, a so-called directional couplers having reversible $\Delta\beta$ can be utilized. A directional coupler with a reversible $\Delta\beta$ is a controllable directional coupler with adjacent sections of oppositely directed phased mismatch and has been discussed in an article by R. V. Schmidt and H. Kogelnik, "Electro-optically switched coupler with stepped $\Delta\beta$ reversal using Ti-diffused LiNbO$_3$ waveguides", *Applied Physics Letters*, Vol. 28, No. 9, May 1, 1976, pp. 503–506. Since the invention utilizes half of a directional coupler only a directional coupler with reversal $\Delta\beta$ with an odd number of stages comes into consideration.

Figure 2:
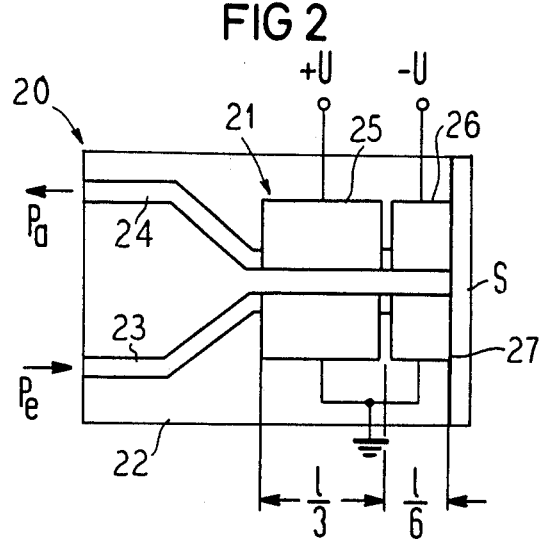
FIG. 2 is a plan view of a 180° beam deflector or device in accordance with the present invention utilizing a switched directional coupler.
Figure 3:
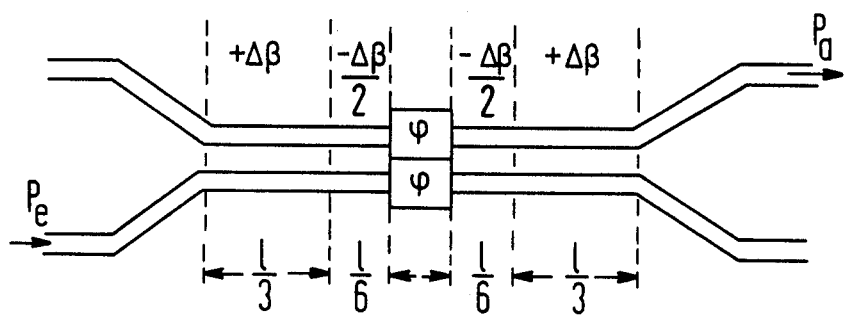
FIG. 3 is a schematic presentation illustrating an equivalent circuit diagram of the device of FIG. 2.

A device or 180°-deflector generally indicated at 20 in FIG. 2 utilizes a controllable directional coupler indicated at 21 which coupler is provided on a substrate 22 and has a pair of waveguides 23 and 24 with adjacent electrode pairs 25 and 26. The half of the directional coupler 21 terminates in a mirror layer S on an edge 27 of the substrate 22 so that although it has a distance of l/2, its effective length is l. As illustrated, the electrode pair 25 has a length of approximately l/3 whereas the electrode pair 26 has a length l/6 and is directly adjacent the mirror S. When a voltage −U is applied to the electrode pair 26 and a voltage +U is applied to the pair 25, the device will be activated with alternating $\Delta\beta$. The structure of the 180°-deflector 20 illustrated is equivalent to the three-stage, oppositely directed phase mismatched directional coupler illustrated in FIG. 3. The illustrated phase shifts $\phi$ are brought about through reflection on the mirror S and for a given equality of the phase shifts $\phi$, they do not influence the fundamental method of operation of the directional coupler. Which fraction of the input-coupled light power $P_e$ is coupled over in the case of a 180°-deflector according to FIG. 2 is established through the matching of the applied voltge U.

In the manufacture of 180°-deflector 20 of FIG. 2, problems will occur due to the necessary processing of the end or edge 27 of the substrate 22 such as by grinding and polishing prior to applying the means forming the mirror S which processing would result in non-precise lengths of material being removed. The equivalent circuit diagram of such a 180°-deflector would then exhibit unequal sections. However, it is known that, in the case of a directional coupler with reversal of the direction of phase mismatch, which coupler has unequal sections of opposite mismatch, a coupling over from one arm or optical waveguide to the other can not be completely obtained with a 100% coupling.

In order to overcome this problem and also in order to prevent short-circuiting of the electrode pair 26 disposed closest to the end face 27 when utilizing a metallic mirror, a 180° generally indicated at 30 in FIG. 4 has a distance d between the pair of control electrodes 36 and the layer forming the mirror S on an edge 33 of the substrate 32. Thus, when compared with a 180° deflector 20 of FIG. 2, the 180° deflector 30 has a small passive directional coupler of a length d inserted between the two portions which are formed by the electrode pair 36. The calculation of the transfer behavior of this structure is conducted under the assumption of an equal amount of opposite mismatch and the terms thus were evaluated with the aid of a computer. As a significant result, it is shown that for the case in which d is different from zero, a complete coupling over of the light from one waveguide such as 33 to a second waveguide 34 is no longer possible. However, by utilizing the mismatch, a point of optimum overcoupling can be adjusted if d amounts to only fractions of the simple coupling length L. When dependence upon the standardized coupler length l/L and the standardized phase mismatch of $\Delta\beta \cdot l/\pi$, the regions in which at least 90% of the light power is coupled over differ for distances d, which are smaller than 0.2 times the simple coupling length L, only insignificantly from those regions which are calculated for a disappearing distance d. Thus, for an assumed simple coupling length L of 1 mm, the distance between the electrode pairs most closely disposed to the end face 37 with the mirror layer S must be smaller than 0.2 mm. This demand can be met according to grinding and polishing experiences which are known at the present time.

Another circuit, in which no short circuit can take place between the control electrodes and the metallic mirror S is the device generally indicated at 40 in FIG. 5. A complete directional coupler similar to this device 40 was described by S. K. Sheem and R. P. Moeller, "Wavelength Monitoring of Single-Mode Diode Laser Using Guided-Wave Interferometer" *Optics Letters*, Vol. 5, No. 5 May 1980, pp. 179–181. The device 40 has a substrate 41 with a pair of strip waveguides 42 and 43 and a pair of electrodes 45 to form a controllable coupler K. The controllable directional coupler K is so phase mismatched with the voltage $U_1$ being applied to the pair of electrodes 45, that it operates as power divider, which is a 3-dB-coupler. Through adjustment of a suitable phase rotation on a phase shifter P by the application of the voltage $U_2$ on an electrode pair 46, a complete coupling-over can then be obtained if the length l of the directional coupler is greater than ¾-times the simple coupling length L and smaller than 3/2-times the simple coupling length L. This demand can be met from a practical point of view. Various lengths of the distance d, between the pair of electrodes 46 and the edge 47, can be compensated by a corresponding corrections of the phase shifter P. Although a structure of the device 40 has approximately twice the overall length in comparison with the device 30 of FIG. 4, the space-savings compared with a circularly curved feedback loop according to the state of the prior art devices is still considerable. A circular feedback loop or device with a radius of curvature r of 10 mm requires a surface area of 10 mm times 20 mm whereas, by contrast, a circuit of the device 40 of FIG. 5 requires a surface of 10 mm times 30 μm.

The required electrodes of the inventive device can, indeed, be directly applied on the waveguide; however, in accordance with conventional methods, an intermediate dielectric layer is advantageously employed. Given a simple coupling length L of 1 mm and a distance d of approximately 0.2 mm, the entire circuit exhibits an overall length of approximately 1.5 mm, whereby connections to other structures are already included, and an overall width of 0.2 mm, which is mainly brought about by the width of the electrodes such as the electrode pairs 35 and 36.

The proposed optical feedbacks can serve the purpose of novel feedback optical systems. A typical example, which has been realized with the aid of monomode optical fibers, is shown by the device generally indicated at 50 in FIG. 6. The device 50 has a substrate 51 with edges 58 and 59. A reversible $\Delta\beta$ directional coupler, which is generally indicated at 52, is applied on the substrate 51 and utilizes a pair of waveguides 53 and 54. The waveguide 54 at one end coacts with a third waveguide 55 and a mirror layer S on an edge 59 to form a 180°-deflector 56. The waveguides 54 and 55 at the opposite end 58 also coact with a mirror layer S to form a second 180°-deflector generally indicated at 57. A light power $P_1(0)$ is introduced into the waveguide 53 and brings about an electric field $E_1(0)$ at the input of the $\Delta\beta$ reversal directional coupler 52. At the end of the directional coupler with a length l, the complex field $E_1(l)$ appears in the waveguide 53 while the complex field amplitude $E_2(l)$ appears in the other waveguide 54 as a consequence of the coupling-over operation in the directional coupler 52. The field amplitude $E_2(l)$ is fed back via a feedback which utilizes the 180°-deflector 56 to feed the field into the waveguide 55 which in turn utilizes a second 180°-deflector to feed back the field into the input end for the waveguide 54 so that the field amplitude $E_2(0)$, appears at the previously still unused input of the $\Delta\beta$ reversal directional coupler. The field amplitude $E_2(0)$ becomes superimposed, in the coupling region of the $\Delta\beta$ reversal directional coupler 52, with a constant field amplitude $E_1(0)$. A small change of the incident wavelength brings about a great change in the phase of the $E_2(0)$, since the complex amplitude $E_2(0)$ is delayed by approximately two times the length $L_s$ of the substrate 51.

The device 50 of FIG. 6 represents a spectral comb filter which when viewed optically, corresponds to a ring resonator. Since this spectral optical filter can be constructed in a narrow-band fashion, minimum changes in the wavelength of the source can be detected. The structure according to the device 50 of FIG. 6 is distinguished by virtue of the fact that the coupling losses are small and that the polarization is not destroyed. If both inputs of a directional couplers are excited with coherent waves, the light powers at the two outputs of this light coupler are dependent upon the amplitude as well as upon the phase of the light powers at the inputs. Therefore, such a directional coupler shows phase-sensitivity. In the case of some optical communication systems, light sources of a high spectral stability and purity are required. Pursuant to utilization of the phase-sensitivity of directional couplers, spectral wavelength filters of high quality can be realized by an optical feedback from directional coupler output to directional coupler input.

The reflections necessary for the feedback to occur are carried out with the aid of two halved directional couplers with mirror planes SE at a substrate edge. The halved directional couplers such as the 180°-deflector 56 with a mirror plane SE, function like normal directional couplers as schematically illustrated in FIG. 7.

Figure 8:
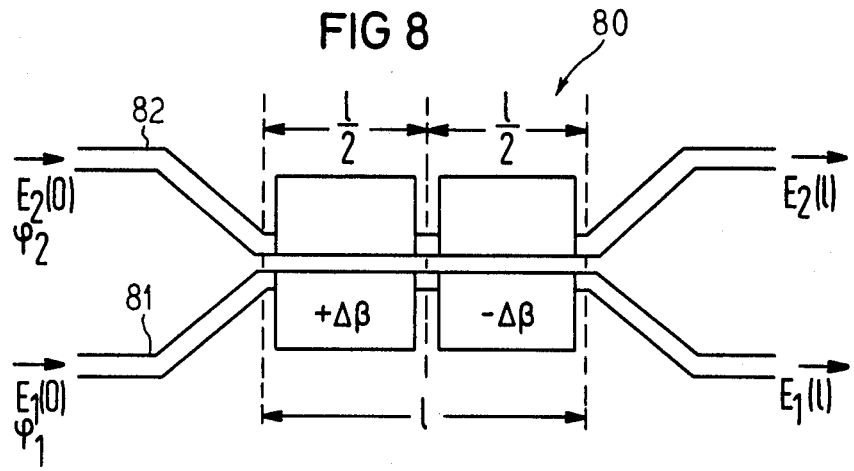
FIG. 8 schematically illustrates the reversible directional coupler.

FIG. 8 illustrates a $\Delta\beta$ reversal directional coupler 80 having a waveguide 81 and a waveguide 82 and having an alternating coupling length l, which is subdivided into two sections having a length of l/2. An incident light wave $E_1(0)$ has a phase $\phi_1 = 0$, and is applied to the waveguide 81. In contrast, an incident light wave $E_2(0)$ which is applied to the waveguide 82 has a delay in relation to $E_1(0)$ by a phase of $\phi_2$. A complex transfer matrix of this system is described in the article by H. Kogelnik and R. V. Schmidt entitled "Switched Directional Couplers with alternating $\Delta\beta$", *IEEE Journal of*

Quantum Electronics, Vol. QE-12, No. 7, July 1976, pp. 396–401, which was cited hereinabove.

Figure 9:
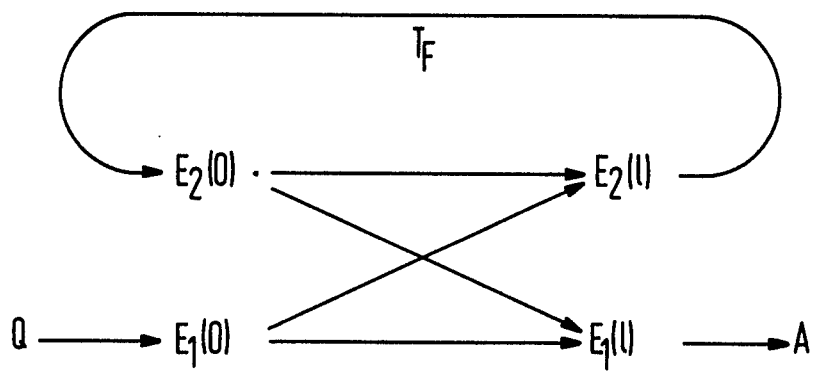
FIG. 9 illustrates a mathematical model of the feedback system of the device of FIG. 6.

FIG. 9 shows a mathematical model for the entire feedback system of the structure of the device 50 of FIG. 6. The transfer function $T_F(j\omega)$ of the feedback loop is assumed as $$T_F(j\omega) = \mathcal{H} e^{-j\omega t_F}$$

whereas, $\mathcal{H}$ designates the feedback efficiency including all losses of the waveguides and the mirrors S. The $\omega$ is the light frequency and the $t_F$ represents the delay time which is brought about by the feedback loop of the length $2 L_s$. Thus, the $$t_F = (2L_s/c_o) n_{eff}$$

wherein $c_o$ is the light velocity and $n_{eff}$ is the effective refractive index of the guided mode.

The relation is valid: $E_2(0) = T_F E_2(1)$. The complex transfer function of the system or the device 50 of the FIG. 6 is defined as follows: $H(j\omega) = E_1(l)/E_1(0)$. For practical purposes, only the transfer function of the light power $H_P(\omega) = |H(j\omega)|^2$ is of interest. Since the feedback efficiency is constant, the transfer function of the light power $H_p(\omega)$ is a periodic function corresponding to the frequency.

If the feedback efficiency is replaced by the efficiency of the feedback power $\eta = \mathcal{H}^2$, then the light power transfer function $H_P$ is influenced by four parameters. These are primarily the frequency $\omega$, the efficiency $\eta$ of the feedback power, the standardized directional coupler length $\delta = l/L$ and the standardized phase mismatch $\alpha = \Delta\beta \cdot l/\eta$. If one assumes a wavelength $\lambda_o$ of 1.3 $\mu m$, a substrate length $L_S$ of 20 mm, and an effective refractive index for lithium niobate, $n_{eff}$ of 2.2, then the ratio $L_s/\lambda_o$ is greater than $10^4$, for which reasons the phase of the feedback loop $\phi_F = \omega \cdot t_F$ is very frequency sensitive. Calculations have shown that the minima are removed from the function $H_P$ by the frequency $f_P = c_o/(2 \cdot L_s \cdot n_{eff}) = 3.4$ GHz. For the case $\Delta\beta = 0$, one obtains particularly narrow-band comb filters in the case of a rather large efficiencies of the power feedback $\eta > 0.5$ and with $2N < \delta < N + 0.5$, whereby $N = 0, 1, 2, \ldots$ For the case in which $\Delta\beta$ is different from zero, a directional coupler length of $l = 5.75 L$ was assumed, for which, in the case of $\Delta\beta = 0$, a not particularly narrow-band filter was obtained. For a standardized phase detuning $\alpha$ of approximately 2.5, the function $H_P$ obtains an absolute minimum. If then $\alpha$ is further enlarged, the positions of the relative minima of $H_P$ becomes displaced. For $\alpha$ of approximately 5, the position of the relative minimum of $H_P$ in relation to the position of the relative minimum of $H_P$ for disappearing $\alpha$ is displaced by approximately $f_P/2$. This shows two advantages of the device 50 of FIG. 6. One of these advantages is the filter structure with non-optical directional coupler lengths l can be detuned to very narrow-band filters. The other advantage is that the stop bands and pass bands of the filters can be displaced through electrically brought about detuning $\Delta\beta$.

The influence of the temperature is dependent upon the polarization of the guided mode. In the case of utilization of lithium niobate, with a temperature change of 1K, the peak of the frequency passed through by the filter, for $HE_{00}$-mode, is displaced by 0.4 GHz. If the temperature of the entire filter substrate is controlled, displacements in the frequency of a laser with a very high resolution can be proven. If an additional phase shifter is applied in the feedback loop, the filter according to the device 50 of FIG. 6 can be continuously detuned in frequency.

The device 50 provides a resonator which additionally exhibits the following advantages: the strength of the feedback can be optionally altered via the two feedback couplers, so that, for example, an additional modulation is possible. The resonator length, given the same overall length and only insignificantly greater width, can become twice as great. The attenuation in the feedback loop can be influenced. The structure according to the device 50 of FIG. 6 relates to a co-directional, feedback-free coupling in which no influence on the source Q or the coupling input, respectively takes place.

Although various minor modifications may be suggested by those versed in the art, it should be understood that we wish to embody within the scope of the patent granted hereon, all such modifications as reasonably and properly come within the scope of our contribution to the art.

We claim:

1. A device comprising a substrate having a pair of strip waveguides disposed thereon and arranged in a form of a directional coupler and a mirror on a pair of end faces of the waveguides so that light traveling therein is reflected.

2. A device according to claim 1, wherein the mirror on the end face causes the directional coupler to be one-half of a directional coupler.

3. A device according to claim 2, which includes control electrodes being arranged in pairs on the substrate adjacent the directional coupler so that adjacent portions of the directional coupler can be phase mismatched in opposite directions.

4. A device according to claim 3, wherein the mirror for the end faces is spaced a distance d from the adjacent pair of electrodes.

5. A device according to claim 1, which includes control electrode pairs which enable oppositely directed mismatching of the phase in adjacent sections of the waveguides.

6. A device according to claim 5, wherein one of said pairs of the electrodes forms a phase shifter which is arranged between the directional coupler and the mirror end face of a strip waveguide.

7. A device according to claim 6, wherein another pair of electrodes acts on the directional coupler and creates a power divider.

8. A device according to claim 7, wherein the phase shifter is spaced a distance d from the mirror.

9. A device according to claim 1, which includes a phase shifter being arranged between the directional coupler and the mirror for the end faces of the strip waveguides.

10. A device according to claim 9, wherein the phase shifter is controllable.

11. A device according to claim 9, wherein the directional coupler is controllable and operates as a power divider.

12. A device according to claim 9, wherein said phase shifter is controllable and is spaced a distance d from the mirror for the end faces.

13. A device according to claim 1, wherein the directional coupler is one-half of the directional coupler with a mirror acting on the end faces of one-half of the coupler to provide a portion of a spectral comb filter.

14. A device according to claim 13, which includes a controllable directional coupler being formed of one of the waveguides of the half directional coupler, said one waveguide at the opposite end having a second one-half directional coupler and the end faces of both one-half directional couplers being provided with the mirror.

15. A device according to claim 14, wherein the controllable directional coupler is a two-stage $\Delta\beta$ directional coupler.

16. A device for use as a spectral comb filter comprising a substrate having a pair of stripped waveguides arranged thereon as a directional coupler, means for controlling the directional coupler, one of the strip waveguides of said directional coupler terminating at two opposite ends with a third common stripped waveguide to form two one-half directional couplers, and a mirror for each of the exposed ends of said one waveguide and third waveguide so that each of said one-half waveguides form a 180° deflector.

17. A device according to claim 16, wherein the controllable directional coupler is a two-stage $\Delta\beta$ directional coupler.

18. A device comprising a substrate having a pair of strip waveguides disposed on the substrate to extend to one edge thereof and being arranged in a form of a directional coupler and said one edge having a mirror for a pair of end faces of the waveguides so that light traveling in the waveguide and therebetween is reflected.

19. A device according to claim 18 wherein the portion of the waveguide of the coupler are approximately one half the necessary coupling length and coact with the mirror to form the coupler.

* * * * *